United States Patent
Claydon et al.

(10) Patent No.: US 9,411,549 B2
(45) Date of Patent: Aug. 9, 2016

(54) DYNAMIC GENERATION OF TEST IMAGES FOR AMBIENT LIGHT TESTING

(71) Applicant: Calgary Scientific, Inc., Calgary (CA)

(72) Inventors: David Christopher Claydon, Calgary (CA); Kevin Edward Matte, Calgary (CA); Colin John Holmes, Vancouver, WA (US)

(73) Assignee: Calgary Scientific Inc., Calgary, AB (CA)

( * ) Notice: Subject to any disclaimer, the term of this patent is extended or adjusted under 35 U.S.C. 154(b) by 307 days.

(21) Appl. No.: 14/136,827

(22) Filed: Dec. 20, 2013

(65) Prior Publication Data

US 2014/0184648 A1 Jul. 3, 2014

Related U.S. Application Data

(60) Provisional application No. 61/740,893, filed on Dec. 21, 2012.

(51) Int. Cl.
  *G06F 3/14* (2006.01)
  *G06T 3/40* (2006.01)

(52) U.S. Cl.
  CPC ............... *G06F 3/14* (2013.01); *G06T 3/4092* (2013.01); *G06T 2200/16* (2013.01)

(58) Field of Classification Search
  CPC ............ G09G 2320/0693; G09G 2320/0276; G09G 2380/08; G06T 2207/30004
  See application file for complete search history.

(56) References Cited

U.S. PATENT DOCUMENTS

| | | | |
|---|---|---|---|
| 7,999,852 B2 | 8/2011 | Deroo et al. | |
| 8,127,221 B2 * | 2/2012 | Vaschillo | G06F 17/212 |
| | | | 715/209 |
| 2007/0115282 A1 | 5/2007 | Turner et al. | |
| 2008/0062438 A1 * | 3/2008 | Lin | G06K 9/42 |
| | | | 358/1.2 |
| 2008/0112601 A1 | 5/2008 | Warp | |
| 2010/0050114 A1 * | 2/2010 | Braun | G06F 3/04817 |
| | | | 715/788 |
| 2011/0087651 A1 | 4/2011 | Westin et al. | |
| 2012/0084350 A1 | 4/2012 | Xie | |
| 2012/0229490 A1 | 9/2012 | Rezaee | |

(Continued)

FOREIGN PATENT DOCUMENTS

| | | |
|---|---|---|
| CA | 2733860 | 9/2012 |
| WO | 2014/037817 | 3/2014 |

OTHER PUBLICATIONS

Gibbons, Michael, "Mobile Imaging," Advance Healthcare Network's ExecutiveInsight, Jul. 2011, 3 pages.

(Continued)

*Primary Examiner* — Gregory J Tryder
*Assistant Examiner* — Scott E Sonners
(74) *Attorney, Agent, or Firm* — Meunier Carlin & Curfman LLC

(57) ABSTRACT

In a remote access environment that includes a server, a client device may remotely access, e.g., medical images from the server and may be provided with a mechanism to retrieve a test image, such as the TG-18 CT or TG-18 MP sample test patterns. The client device communicates display size information to the server, which generates the test image on-the-fly for the particular display size of the client device. For example, components in the test image and borders may be scaled to create an appropriate test image for any client device.

7 Claims, 6 Drawing Sheets

(56) References Cited

U.S. PATENT DOCUMENTS

2013/0007603 A1* 1/2013 Dougherty .............. G06T 11/60
                                                        715/251
2013/0155039 A1* 6/2013 Fujinaka .................. G09G 5/00
                                                        345/204

OTHER PUBLICATIONS

Samei, Ehsan, "Assessment of display performance for medical imaging systems," Report of the American Association of Physicists in Medicine (AAPM) Task Group 18, Imaging Informatics Subcommittee, On-Line Report No. 3, 2005, pp. i-iii and 40-66.

Synapse Mobility 3.2 User Guide for iOS Mobile Devices, Apr. 11, 2013, pp. 1-3 and 42-43.

International Search Report and Written Opinion, dated Aug. 21, 2014, received in connection with International Application No. PCT/IB2013/003245.

Samei, Ehsan, "Assessment of display performance for medical imaging systems: Executive summary of AAPM TG18 report," Med. Phys., vol. 32, No. 4, Apr. 2005, pp. 1205-1225.

* cited by examiner

DYNAMIC GENERATION OF TEST IMAGES FOR AMBIENT LIGHT TESTING

CROSS-REFERENCE TO RELATED APPLICATION

The present disclosure claims priority to U.S. Provisional Patent Application 61/740,893, filed Dec. 21, 2012, entitled "DYNAMIC GENERATION OF TEST IMAGES FOR AMBIENT LIGHT TESTING," which is incorporated herein by reference in its entirety.

BACKGROUND

Medical images housed within Picture Archiving and Communication Systems (PACS) are typically accessed by specialized display workstations under controlled lighting conditions, the so-called "radiology reading room". Such conditions are maintained to provide predetermined level of display image quality as part of the diagnostic imaging practice, as it is important to ensure that electronic display at the display workstations does not compromise image quality. In furtherance of that goal, display standards have been created, such as that of the American Association of Physicists in Medicine (AAPM) Task Group 18 (TG-18). Information about the TG-18 display performance standards may be found in "Assessment of Display Performance for Medical Imaging Systems," American Association of Physicists in Medicine, April 2005, which is incorporated herein by reference in its entirety. The TG-18 provided guidelines to end users for in-field performance evaluation of electronic display devices intended for medical use. The TG-18 testing methods include test images for evaluating the performance of electronic display devices and recommended minimum performance requirements for utilization of electronic displays in medical and radiologic applications. The AAPM provides the test images as downloadable files from designated servers.

However, the TG-18 test images were designed for specific display resolutions. Now, with the growing use of mobile devices to remotely access medical image data from PACS systems, the TG-18 test images are not properly scaled for use on the overwhelming number of display sizes of the mobile devices.

SUMMARY

Disclosed herein are systems and methods for providing a test image, such as the TG-18 CT or TG-18 MP sample test patterns, to client devices in a remote access environment. The client device communicates display size information to a server in the environment, which generates the test image on-the-fly for the particular display size of the client device. For example, components and borders in the test image may be scaled to create an appropriate test image for any client device.

In accordance with some implementations, there is provided a method of dynamically generating a test image for a client device from a standard test image on a server, the standard test image having components therein and a border defined by a horizontal margin and a vertical margin. The method includes receiving, at a server, display dimensions from a client device; determining if a minimum dimension of the display dimensions is less than a first predetermined value; if the minimum dimension is less than the first predetermined value, then reducing a size of the components by a factor of the minimum dimension divided by the predetermined value for rendering the test image for display at the client device; and if the minimum dimension is not less than the first predetermined value, then determining if the minimum dimension is less than or equal to a second predetermined value. If the minimum dimension is less than or equal to the second predetermined value then adjusting at least one of the vertical margin and the horizontal margin to maintain an array of boxes in a centered position with respect to the test image for rendering the test image for display at the client device; and if the minimum dimension is not less than or equal to the second predetermined value then increasing a size of the components by a factor of the minimum dimension divided by the second predetermined value for rendering the test image for display at the client device.

In accordance with some implementations, there is provided a method of generating a test image where the test image has components therein defining a component width and a component height, and the test image has a border defined by a horizontal margin and a vertical margin. The method includes, receiving, at a server, display dimensions from a client device; determining if a minimum dimension of the display dimensions is greater than a first predetermined value; if the minimum dimension is greater than the first predetermined value then: increasing a size of the component width and the component height by a factor of the minimum dimension divided by the predetermined value, rounding down to a nearest multiple of a second predetermined number and adding a third predetermined number of pixels to the border; scaling the components to fit within a new size of the component width and the component height; and displaying the test image at the client device. If the minimum dimension is less than the first predetermined value, then determining if a display width is less than the component width, and if so, iteratively reducing the component width by the second predetermined value until the display width is not less than the component width; determining if a display height is less than the component height, and if so, iteratively reducing the component width by the second predetermined value until the display width is not less than the component width; scaling the components to fit within a new size of the component width and the component height; and displaying the test image at the client device.

In accordance with some implementations, there is provided a method of generating a test image, the test image having components therein and having a horizontal margin and a vertical margin, the method comprising receiving, at a server, display dimensions from a client device; determining if a minimum dimension of the display dimensions is less than a first predetermined value, and if not, increasing a size of the components in accordance with the a first factor determined in accordance with the minimum dimension and the first predetermined value; and if the minimum dimension of the display dimensions is less than the first predetermined value, reducing a size of the components in accordance with a first factor determined in accordance with the minimum dimension or reducing the size of the components in accordance with a second factor determined in accordance with the minimum dimension and a second predetermined value.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Overview

In accordance with aspects of the present disclosure, in a remote access environment, a client device may be provided with a mechanism to retrieve a test image, such as the TG-18 CT or TG-18 MP sample test patterns. The test image is generated on-the-fly for the particular display size of the client device. Thus, an appropriate test image can be created for any client device, as described below.

Example Environment

Figure 1:
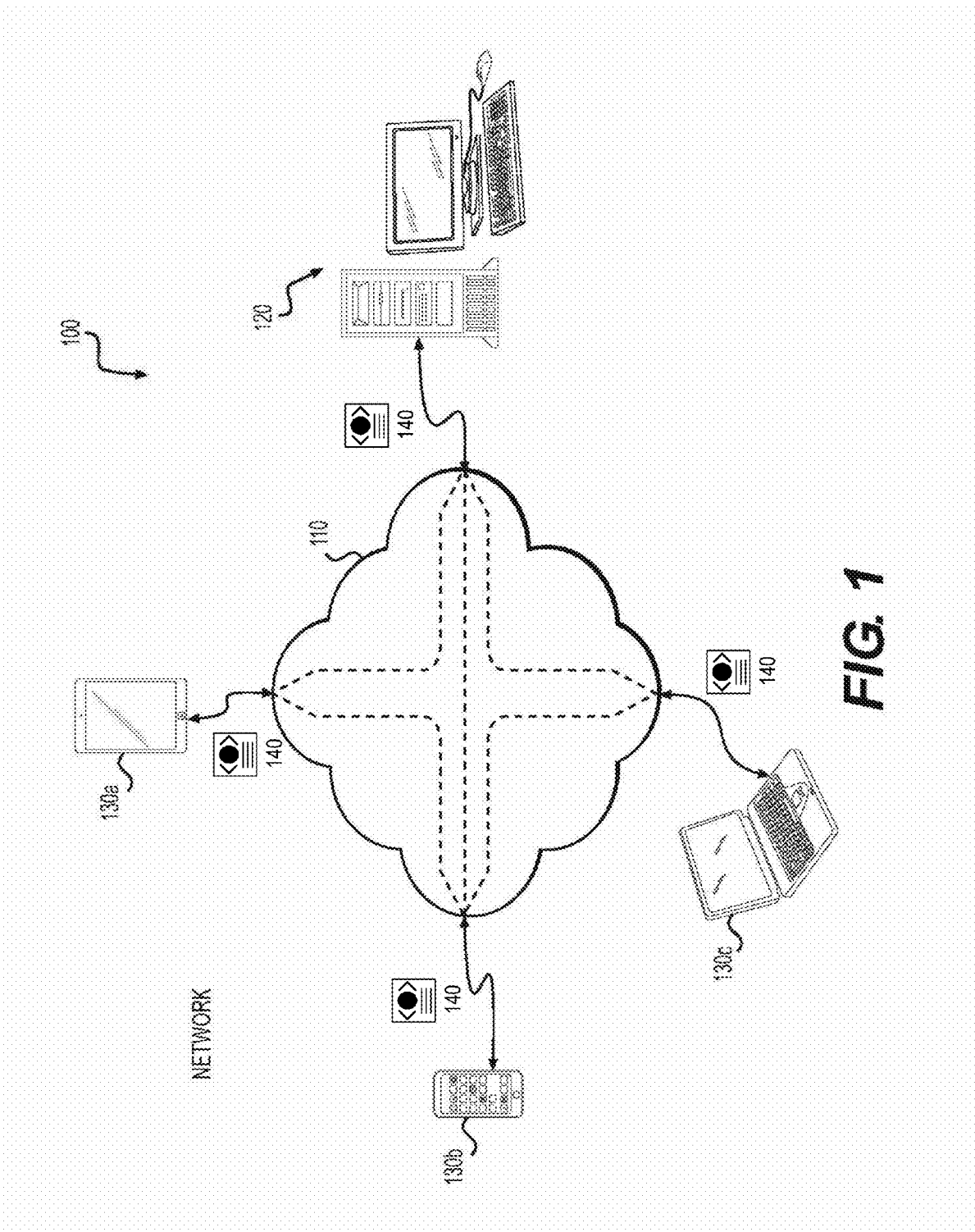
FIG. 1 is a simplified block diagram illustrating a system for providing remote access to an application at a remote device via a computer network.

With the above overview as an introduction, FIG. 1 provides a diagram of an exemplary image viewing network 100 over which processes and systems consistent with the presently disclosed dynamic test image rendering service may be implemented. As illustrated in FIG. 1, image viewing network 100 may include a plurality of devices that may be communicatively coupled to one another (or to a centralized server) to facilitate the distribution of data, such as imaging data, between or among the constituent devices. According to one embodiment, image viewing network 100 may include a server 120 and one or more client devices 130a-130c, each of which may be communicatively coupled to communication network 110. The listing of components illustrated in FIG. 1 is exemplary only and not intended to be limiting. Indeed, it is contemplated that additional, fewer, and/or different devices than those shown in FIG. 1 may be included as part of image viewing network 100 without departing from the scope of the present disclosure.

Communication network 110 may include or embody any data or telecommunications network that allows any number of network compatible devices, such as server 120 and client devices 130a-130c, to exchange data with other network compatible devices, both internal and external to image viewing network 100. For example, communication network 110 may provide a gateway for coupling server 120 and/or client devices 130a-130c with one or more servers on the World Wide Web using any combination wired or wireless communication platforms. Communication network 110 may include a wireless networking platform such as, for example, a satellite communication system, a cellular communication system, or any other platform for communicating data with one or more geographically dispersed assets (e.g., Bluetooth, microwave, point-to-point wireless, point-to-multipoint wireless, multipoint-to-multipoint wireless.) Alternatively or additionally, communication network 102 may include or embody wireline networks such as, for example, Ethernet, fiber optic, waveguide, or any other type of wired communication network.

The server 120 may include any processor-based computer system suitable for configuration as a centralized node for distributing and/or sharing data, such imaging data with one or more other computer systems. The server 120 may further include a remote access application to enable the client devices 130a-130c to remotely access services offered by the server 102. Still further, the server 120 may include an imaging application that processes the image data for viewing by one or more end users using one of the client devices 130a-130c. In general, server 120 may be configured to perform server-side image processing and rendering functions, and deliver and/or serve the processed image information to the requesting client device. According to one embodiment, server 120 may include a Windows or Linux-based multi-processor computing platform that is coupled to an imaging database. In the above, an example remote access application may be part of the PureWeb architecture available from Calgary Scientific, Inc., Calgary, Alberta, Canada. An example imaging application is ResolutionMD available from Calgary Scientific, Inc., of Calgary, Alberta, Canada Client devices 130a-130c may each include any processor-based computing device suitable for receiving image data from server 120 and render the image data on a display. Client devices 130a-130c may be configured for establishing a secure connection with server 120 and/or other client devices coupled to communication network 110 in order to send and receive image information across communication network 110. Client devices 130a-130c may be include smart phones, tablets, laptop/desktop/netbook computing devices, wearable media consumption devices (e.g., optical head-mounted display (OHMD), smart watch, etc.), or any other types of processor-based computing system suitable for accessing server 120 and rendering images and related data on a display associated with the respective device.

As further shown in FIG. 1, a state model 140 may be communicated between the server 120 and/or client devices 130a-130c. The state model 140 contains application state information that is updated in accordance with user input data received from a user interface program or imagery currently being displayed by the client device 130a-130c. The remote access server also updates the state model 140 in accordance with the screen or application data and provides the same to the client device 130a-130c for display.

In the environment of the present disclosure, the state model 140 may contain information about images being viewed by a user of the client device 130a-130c, i.e. the current view. The state model 140 may also contain information about the display area of the client device 130a-130c. This information may be used when rendering image data and test images at the server 120 and/or the client 130a-103c. Thus, information in the state model 140 may be used to enable test images to be rendered on either the client 130a-130c or the server 120, and switching therebetween.

TG-18 Test Images

In some implementations, the environment of FIG. 1 may be used to view diagnostic images. In such environments, there is a need to insure that the client device displays do not compromise image quality and ultimately patient care. As such, standard test images, such as those described below, have been published to provide for testing and quality control of client devices on which diagnostic image data is displayed.

Figure 2:
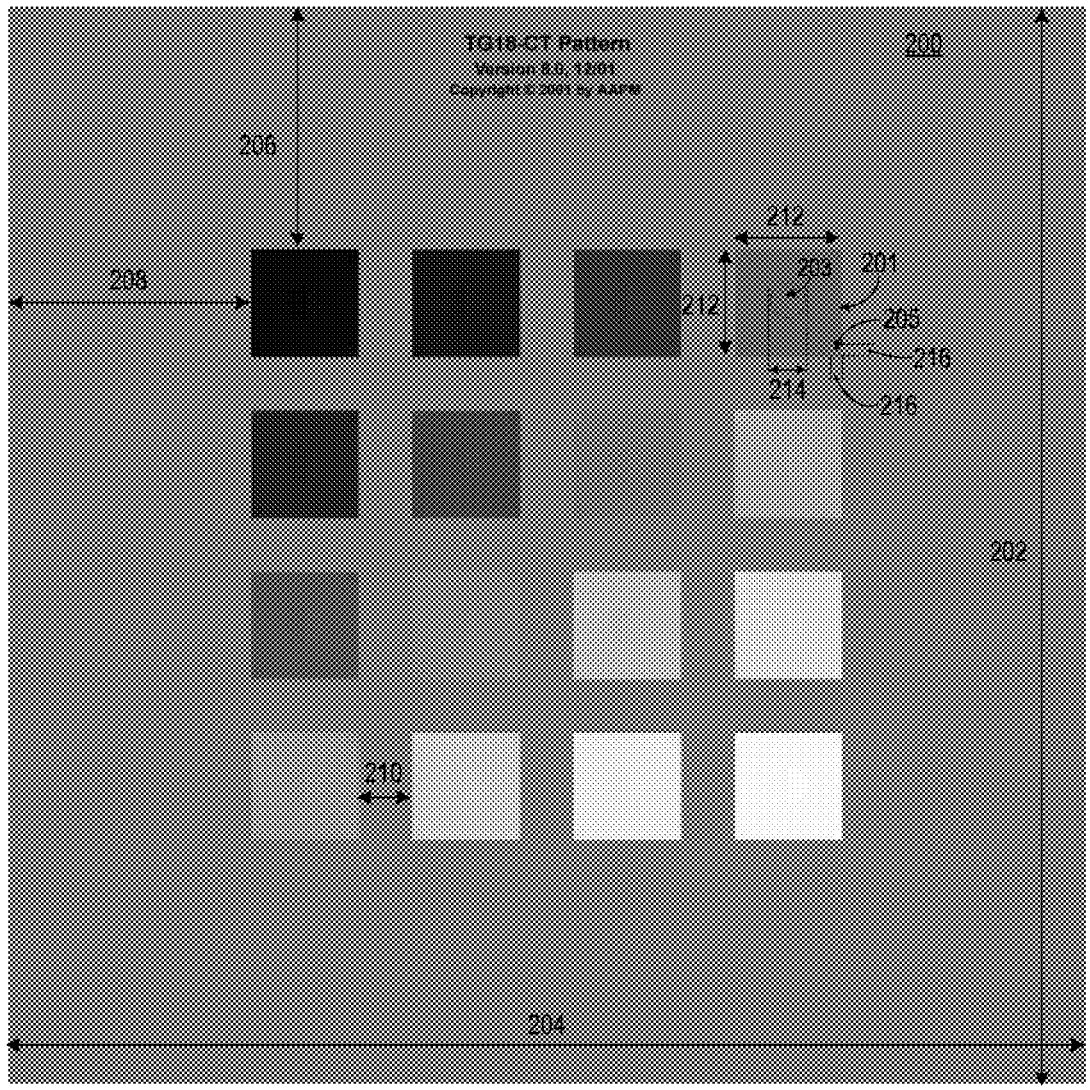
FIG. 2 illustrates a TG-18 CT image test pattern.

FIG. 2 illustrates a TG-18 CT image test pattern 200. The TG-18 CT test pattern is used to assess the contrast transfer characteristics associated with the luminance response of the display of a computing device. The pattern 200 includes an array of 16 boxes 201 varying in luminance from 8 [128] to 248 [3968] embedded in a uniform background. Each box 201 differs in pixel value by the same amount and contains four small 10×10 corner boxes 205 at ±4 [±64] pixel value difference from the background. In addition, at the center of each box 201 is a circle 203, where each side of the circle is a ±2 [±32] pixel value difference from the background.

Figure 3:
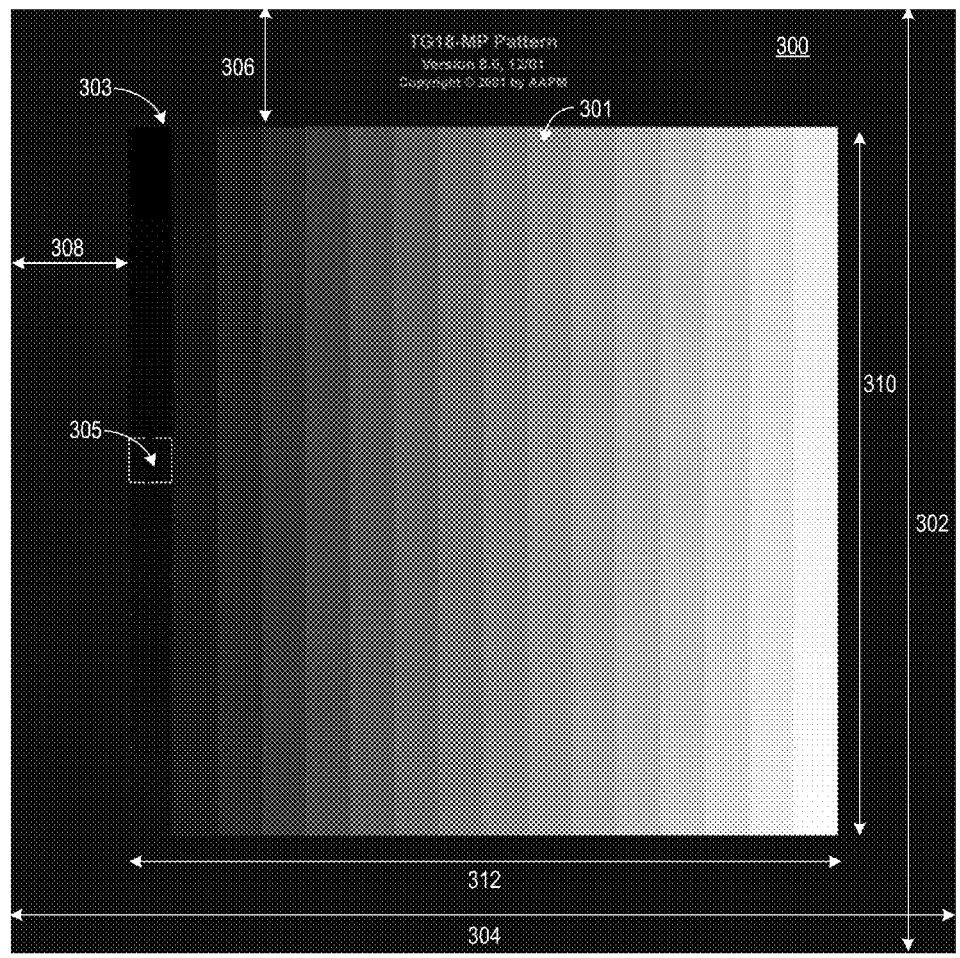
FIG. 3 illustrates a TG-18 MP image test pattern.

The image test pattern 200 has a defined height 202 and width 204. For example the height 202 and width 204 is 1024 pixels. The array of boxes 201 is positioned having a vertical margin 206 and a horizontal margin 208 from respective edges of the image test pattern 200. Each box 201 in the array has a side 212 having a length of 102 pixels. The boxes 201 are separated by a distance 212 of 51 pixels. The circle 203 within each box 201 (a representative circle 203 emphasized for purposes of the present disclosure) has a diameter 214 of 34 pixels and the four corner boxes 205 have sides 216 having a dimension of 10 pixels. As will be described below, when an image test pattern 200 is generated on the fly for a particular display size in accordance with the present disclosure, the various dimensions described above are adjusted/scaled to maintain relative sizes of the boxes, circle, corner box, and spacing between the boxes. Thus, the image test pattern 300 may be scaled to create an appropriate test image for any client device FIG. 3 illustrates a TG-18 MP images test pattern 300. TG18-MP is designed for visual assessment of display bit depth. The test pattern 300 includes a background of 256 (i.e., black), and pattern contains 16 ramps, each covering 1/16 of a 12-bit pixel value range from 0 to 4095. Small markers indicate 8-bit and 10-bit pixel value transitions. The image test pattern 300 has a defined height 302 and width 304. For example the height 302 and width 304 may be 1024 pixels. Within a central portion of the image test pattern 300, there is a series of 16 vertical bands 301 forming a central box 303, where each band 301 is a ramp of 16 boxes 305 (a representative box 305 emphasized for purposes of the present disclosure) containing incremental shades of grey. A central box 303 has a vertical margin 306 and a horizontal margin 308 from respective edges of the image test pattern 300. Each band 301 has a width 312 of 48 pixels. As will be described below, when an image test pattern 300 is generated on the fly for a particular display size in accordance with the present disclosure, the various dimensions described above are adjusted/scaled to maintain relative sizes of the boxes, circle, corner box, and spacing between the boxes. Thus, the image test pattern 300 may be scaled to create an appropriate test image for any client device.

Dynamic Generation of TG-18 Test Images

Figure 4:
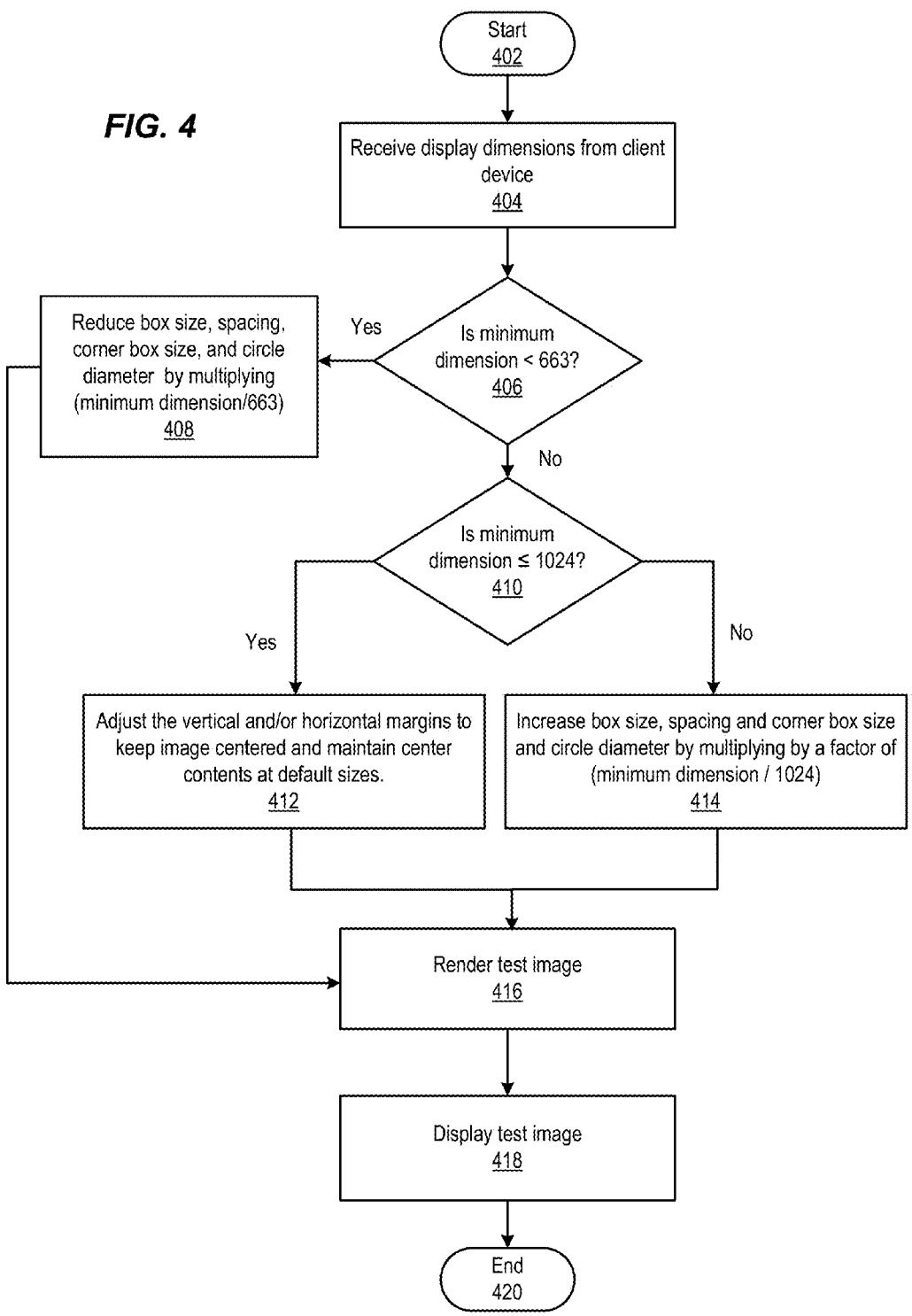
FIG. 4 illustrates an operational flow diagram of processes performed to provide dynamic generation of a TG18-CT test image in accordance with client device display area in the environment of FIG. 1.

FIG. 4 illustrates an operation flow 400 for dynamic generation of a TG18-CT test image in accordance with client device display area. The operational flow may be performed by the server 120 or a combination of the server 120 and client devices 130*a*-130*c*. At 402, the process begins. For example, the server 120 may expose a web API that is called by the client device. At 404, information regarding the client display is received. For example, the server 120 may receive display area information from the client device in the state model 140. Alternatively, a window size may be defined within the client display area. At 406, it is determined if a minimum dimension is less than 663 pixels. The value of 663 pixels is used herein as it is a minimum size that can accommodate the TG-18 CT default box sizes (102 pixels×4) and spacing (51 pixels×5). Typically a display area is measured as a width times a length (e.g., 480×800 px), where one dimension is larger than the other. Often, the width of a handheld display is smaller than the length of the display; therefore the minimum dimension is typically the width value (e.g., 480 px). It is noted that when the display is rotated, the TG-18 CT image also rotates accordingly.

If, at 406, the minimum dimension is less than 663 pixels then the process continues at 408, where the box size, spacing, corner box size, and circle diameter are reduce by multiplying the minimum dimension determined at 406 by 663. With reference to FIG. 2, the block size 212, spacing 210, corner box size 216, and circle diameter 214 are reduced in accordance with the relationship of the minimum dimension divided by 663. The process continues at 416, where the test image is rendered. For example, the server 120 may render a test image in accordance with the sizes determined at 408. At 418, the test image is displayed at the client device. In some implementations, the test image may be rendered at the client device 130*a*-130*c* at 416 and displayed at 418.

If at 406, the minimum dimension is not less than 663 pixels then the process continues at 410, where is determined if the minimum dimension is less than or equal to 1024 pixels. If the minimum dimension is less or equal to than or equal to 1024 pixels, then at 412, the vertical and/or horizontal margins are adjusted to maintain the image in a center position and to maintain the center contents at default sizes. For example, the vertical margin 206 and/or the horizontal margin 208 may be adjusted to center the array of boxes 301 within the test image. The process continues at 416, where the test image is rendered. For example, the server 120 may render test image in accordance with the sizes determined at 412. At 418, the test image is displayed at the client device. In some implementations, the test image may be rendered at the client device 130*a*-130*c* at 416 and displayed at 418.

If that 410 the minimum dimension is not less than or equal to 1024 pixels, then at 414, the box size, spacing, corner box size and circle diameter multiplied by a factor of the minimum dimension divided by 1024. With reference to FIG. 2, the block size 212, spacing 210, corner box size 216, and circle diameter 214 are multiplied by a factor of the minimum dimension divided by 1024. The process continues at 416, where the test image is rendered. For example, the server 120 may render test image in accordance with sizes determined at 414. At 418, the test image is displayed at the client device. In some implementations, the test image may be rendered at the client device 130*a*-130*c* at 416 and displayed at 418. After the test image is sent to the client device 418, the process ends at 420.

Thus, the operational flow 400 provides a method for generating TG18-CT on-the-fly in accordance with a display size of the client device. The operational flow 400 serves to adjust the various components of the test image 300 such that they appropriately sized for the display.

Figure 5:
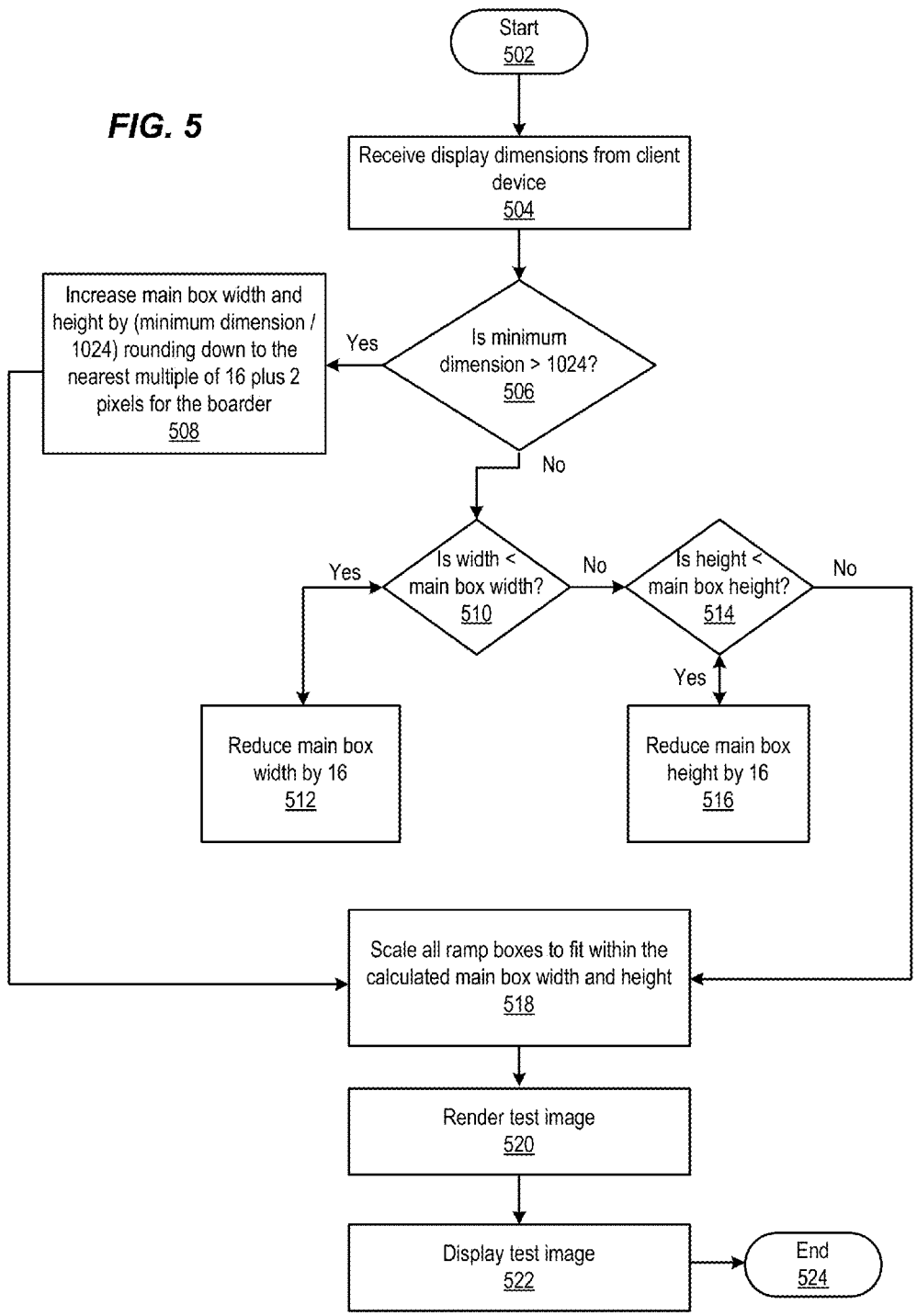
FIG. 5 illustrates an operational flow diagram of processes performed to provide dynamic generation of a TG18-MP test image in accordance with client device display area in the environment of FIG. 1.
Figure 6:
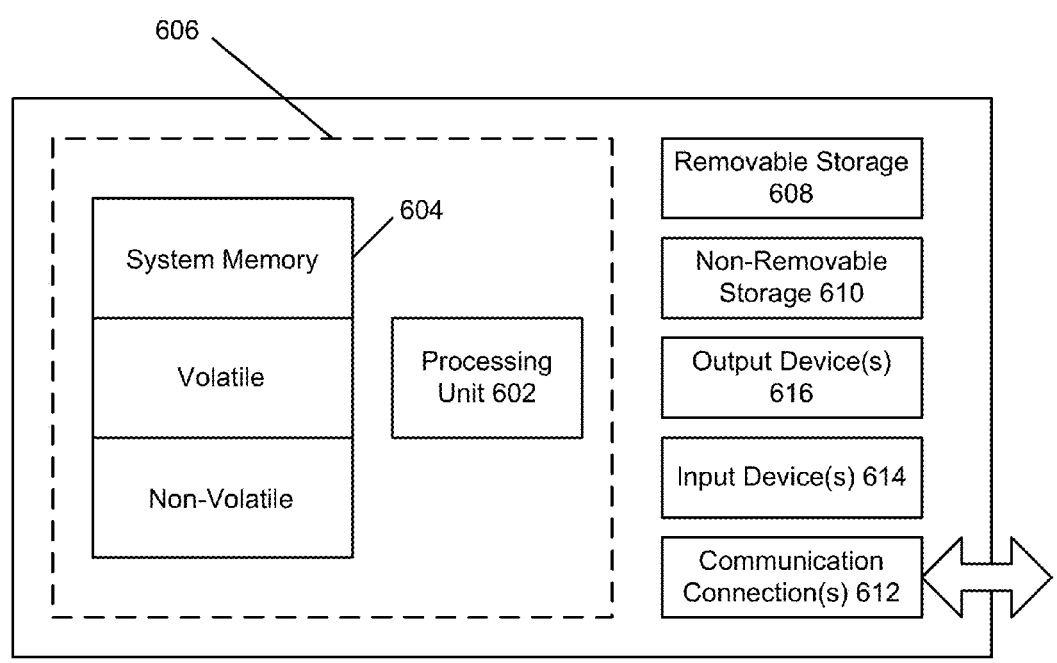
FIG. 6 illustrates an exemplary computing device.

FIG. 5 illustrates an operation flow 500 for dynamic generation of a TG18-MP test image in accordance with a client device display area. The operational flow may be performed by the server 120 or a combination of the server 120 and the client devices 130*a*-130*c*. At 502, the process begins. For example, the server 120 may expose a web API that is called by the client device. At 504, information regarding the client display is received. For example, the server 120 may receive display area information from the client device in the state model 140. Alternatively, a window size may be defined within the client display area. At 506, it is determined if the minimum dimension is greater than 1024 pixels. As noted above, the minimum dimension is the lesser of the length and width of the display area of the client device. It is noted that when the display is rotated, the TG-18 MP image also rotates accordingly. If the minimum dimension is less than 1024 pixels, then at 508, the main box width and height is increased by the factor of the minimum dimension divided by 1024, rounding down to the nearest multiple 16 and adding 2 pixels for the border. For example, the main box with 312 and the height 310 are increased by the above-noted factor. Next, at 518, the ramp boxes 305 are scaled to fit within the calculated main box 301 width and height from 508. At 520, the test image is sent to the client device for display. At 520, the process continues, where the test image is rendered. At 522, the test image is displayed at the client device. In some implementations, the test image may be rendered at the client device 130a-130c at 520 and displayed at 522. At 524, the process ends.

If at 506, the minimum dimension is not greater than 1024 pixels, then at 510 it is determined if the display width is less than the main box with. The main box width is shown in FIG. 3 by reference numeral 312. If the display width is less than the main box width, then the main box with is iteratively reduced at 512 by a factor of 16. The iterative process at 512 continues until the display width is not less than the main box width 312, at which time the process continues at 514 where it is determined if the display height is less than the main box height 310. If, at 514, the display height is less than the main box height 310, then at 516 the main box height 310 is iteratively reduced by a factor of 16 until the display height is not less than the main box height 310. When this condition is met at 514, the process flows to 518, where the ramp boxes 305 are scaled to fit within the main box width and height from 512 and 516, respectively. At 520, the process continues, where the test image is rendered. At 522, the test image is displayed at the client device. In some implementations, the test image may be rendered at the client device 130a-130c at 520 and displayed at 522. At 524, the process ends.

Thus, the operational flow 500 provides a method for generating TG18-MP on-the-fly in accordance with a display size of the client device. The operational flow 500 serves to adjust the various components of the test image 400 such that they are appropriately sized for the display.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

FIG. 8 shows an exemplary computing environment in which example embodiments and aspects may be implemented. The computing system environment is only one example of a suitable computing environment and is not intended to suggest any limitation as to the scope of use or functionality.

With reference to FIG. 8, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 8 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 8 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of dynamically generating a test image for a client device from a standard test image on a server, the standard test image having components therein defining a component width and a component height, the test image having a border defined by a horizontal margin and a vertical margin, the method comprising:
    receiving, at the server, display dimensions from the client device;
    determining if a minimum dimension of the display dimensions is greater than a first predetermined value;
    if the minimum dimension is greater than the first predetermined value then:
        increasing a size of the component width and the component height by a factor of the minimum dimension divided by the predetermined value, rounding down to a nearest multiple of a second predetermined number and adding a third predetermined number of pixels to the border;
        scaling the components to fit within a new size of the component width and the component height; and
        displaying the test image at the client device;
    if the minimum dimension is less than the first predetermined value, then:
        determining if a display width is less than the component width, and if so, iteratively reducing the component width by the second predetermined value until the display width is not less than the component width;
        determining if a display height is less than the component height, and if so, iteratively reducing the component width by the second predetermined value until the display width is not less than the component width;
        scaling the components to fit within a new size of the component width and the component height; and
        displaying the test image at the client device.

2. The method of claim 1, wherein the first predetermined value is 1024.

3. The method of claim 1, wherein the second predetermined value is 16.

4. The method of claim 1, further comprising rotating the testing image in accordance with an orientation of a display of the client device.

5. The method of claim 1, further comprising exposing a web API at the server that is called by the client device.

6. The method of claim 1, wherein the server receives display area information from the client device in a state model.

7. The method of claim 1, wherein the test image is a TG-18 MP test image.

* * * * *